United States Patent
Rafei

[11] Patent Number: 5,987,975
[45] Date of Patent: Nov. 23, 1999

[54] MACHINE LUBRICATION SYSTEM MONITOR

[76] Inventor: Iraj Rafei, 5706 SW. Hamilton, Portland, Oreg. 97221

[21] Appl. No.: 08/993,665
[22] Filed: Dec. 18, 1997
[51] Int. Cl.⁶ .................................................. G01M 15/00
[52] U.S. Cl. ...................................... 73/117.2; 123/196 S
[58] Field of Search ........................... 73/116, 117.2, 73/117.3, 118.1, 204.19, 204.23, 861.02, 861.03; 123/196 AB, 196 S; 392/480, 481, 485

[56] References Cited

U.S. PATENT DOCUMENTS

| | | | |
|---|---|---|---|
| 4,497,200 | 2/1985 | Tournier | 73/117.3 |
| 4,677,847 | 7/1987 | Sawatari et al. | 73/117.3 |
| 4,796,204 | 1/1989 | Inoue | 73/117.3 |
| 4,839,831 | 6/1989 | Imajo et al. | 73/117.3 |
| 5,107,246 | 4/1992 | Mogaki | 73/118.1 |
| 5,319,963 | 6/1994 | Benford | 73/118.1 |
| 5,646,341 | 7/1997 | Schricker et al. | 73/117.3 |
| 5,795,998 | 8/1998 | Smith | 73/118.1 |
| 5,831,154 | 11/1998 | Guertler et al. | 73/116 |

Primary Examiner—Eric S. McCall
Attorney, Agent, or Firm—Keith A. Cushing

[57] ABSTRACT

A machine lubrication system monitor collects lubricant pressure, flow rate, and temperature information and calculates as a function thereof a substantially constant magnitude signal representing normal machine operation. Deviation therefrom indicates abnormal and potentially damaging machine operation. As a result, variation in lubricating oil viscosity, excess operating temperature, or change in oil flow path, e.g. leakage, in a pressurized lubricating fluid supply may be detected and machine damage avoided.

6 Claims, 5 Drawing Sheets

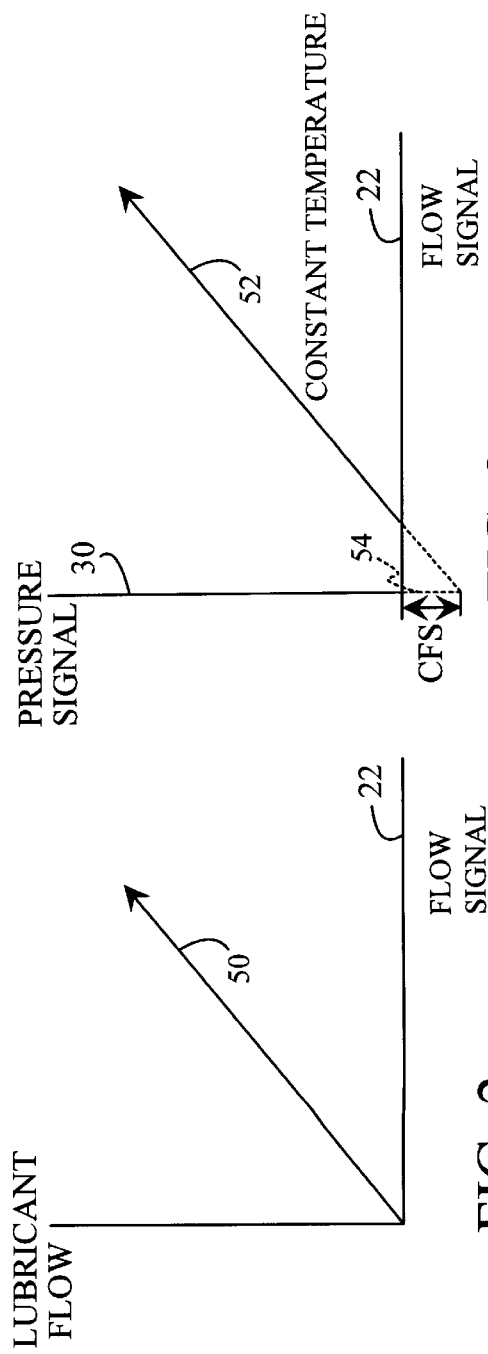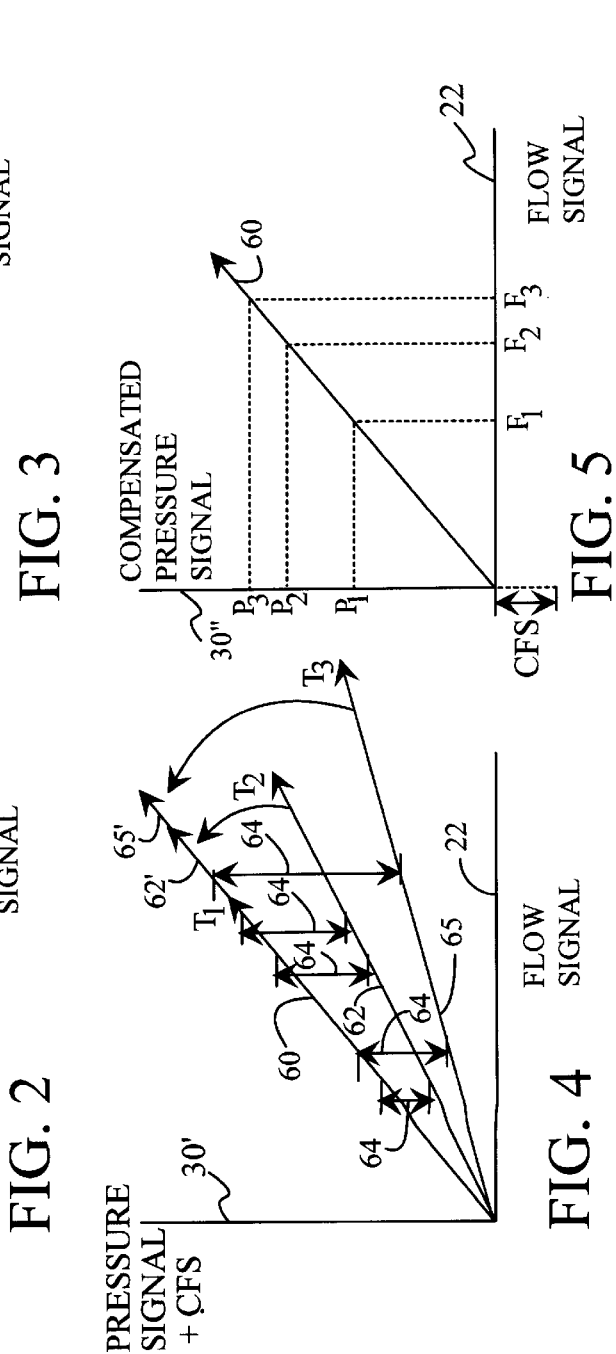

MACHINE LUBRICATION SYSTEM MONITOR

FIELD OF THE INVENTION

The present invention relates generally to monitoring and alarm devices and particularly to monitoring and alarm devices relative to a pressurized lubrication system of a machine.

BACKGROUND OF THE INVENTION

Many machines, particularly internal combustion engines, include a pressurized lubrication system essential to continued machine operation. Lubrication fluid circulates through the machine to maintain the machine cool and avoid damage by reducing friction as it circulates past points of metal-to-metal contact such as bearing surfaces. The lubrication system must maintain a given volume of lubrication fluid, e.g., oil, and must maintain operating temperatures within acceptable parameters. Lubricating fluid, however, degrades over time and changes its viscosity and ability to protect against expensive machine damage. A lubrication system breach, e.g., oil leak, reduces the available lubrication fluid and potentially exposes the machine to damage. A plug in a lubrication system prevents oil flow and also potentially exposes the machine to damage. As machine temperature varies during operation so does lubrication fluid viscosity and its ability to protect.

Many machines include an instrument panel providing indication of operating conditions. For example, an oil pressure gauge and a temperature gauge provide to the operator an indication of the oil pressure and engine temperature. The operator observes such gauges during operation to verify acceptable lubrication system parameters. The operator, if necessary, shuts down the machine when instrument gauges indicate operation outside acceptable parameters, e.g., a lubrication system failure due to loss of lubricant, excess temperature, or significant lubricant degradation.

Unfortunately, oil pressure varies significantly while remaining within normal operation, e.g., as a function of but not limited to variation in engine temperature or engine revolutions per minute (RPM). Engine temperature can vary significantly while remaining within normal or acceptable parameters. Because the lubricating oil pressure and temperature vary in complex fashion, it is not generally possible to identify by operator-interpretation of these gauge readings a need for engine shutdown. In other words an operator cannot always detect potentially damaging conditions within the engine by merely observing the oil pressure and temperature gauges. Oil and temperature gauoes can indicate gross excursions from acceptable parameters however, engine damage can occur when more subtle combinations of these engine operating conditions exist. Accordingly, an operator observing and interpreting oil and temperature gauges may not recognize such unacceptable engine operating conditions. By the time an operator realizes that the oil pressure and engine temperature have exceeded acceptable parameters, significant damage to the engine often has already occurred.

In addition to operator-interpretation of machine parameters by way of an instrument panel, some machines employ automatic shut down systems to prevent machine damage. One machine parameter of particular concern is oil pressure. Because oil pressure varies significantly as a function of oil flow rate through the engine, the physical size of passages of the flow path through the engine, and the temperature and viscosity of the oil flowing through the flow path, automated engine shut down devices remain generally incapable of accurately detecting all potentially enlgine-damaging operating conditions. In other words, oil pressure varies widely during normal enginie operation and existing automated shut down devices must necessarily allow broad variation without automated engine shut down. For extreme variations in oil pressure, an engine shut down can occur with these existing shutdown devices. Unfortunately, potentially engine-daiiatling conditions do arise with some degree of oil pressure and a device reacting to only a relatively low oil pressure fails to reliably avoid engine damage. Thus, automated engine shut down devices have not reliably detected all potentially engine-damaging lubrication conditions.

The subject matter of the present invention provides an automated monitor for an engine lubrication system allowing for normal variation in oil pressure and temperature, yet providing an alarm or shut down signal when engine conditions fall outside acceptable operating parameters.

SUMMARY OF THE INVENTION

A monitor circuit produces first and second signals and calculates a substantially constant output signal as a ratio thereof when the first and second signals remain within acceptable machine operation ranges. When the output signal varies from this substantially constant value, potential damage to the engine exists and an alarm or engine shut down signal occurs. In the illustrated embodiment of the present invention, the first signal is a pressure signal modified according to a constant value representing a charge flow signal and modified according to a temperature-variant signal. The second signal illustrated herein is a flow signal taken from a flow meter.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which:

FIG. 2 illustrates a linear relationship between lubricant flow rate and a flow monitor output signal.

FIG. 3 illustrates a linear relationship between a lubricant pressure signal at constant temperature and a flow monitor signal following an initial charging interval for a lubricant flow path.

FIG. 4 illustrates a temperature-dependent relationship as recognized under the present invention between pressure and flow.

FIG. 5 illustrates a substantially constant ratio identified and employed under the present invention in accordance with the relationship illustrated in FIG. 4.

DETAILED DESCRIPTION OF THE PREFERRED EMBODIMENT

The preferred embodiment of the present invention recognizes an interrelationship between certain machine conditions, e.g., oil pressure, temperature, and flow rate, and determines to a given machine configuration an expected constant magnitude value as a function of these conditions. The preferred embodiment of the present invention applies sensor signals to a monitor circuit taking into account such interrelationships and providing signals for which a ratio may be computed, and produces for normal machine operation a substantially constant output signal. When this output signal deviates from its expected substantially constant value, then abnormal machine operating conditions exist and the engine is shut down automatically or by an operator in response to an automated alarm presentation.

The preferred embodiment of present invention will be illustrated with reference to an internal combustion engine having a pressurized oil lubrication system. However, it will be understood that the present invention may be applied to a variety of machines making use of a lubrication system.

Figure 1:
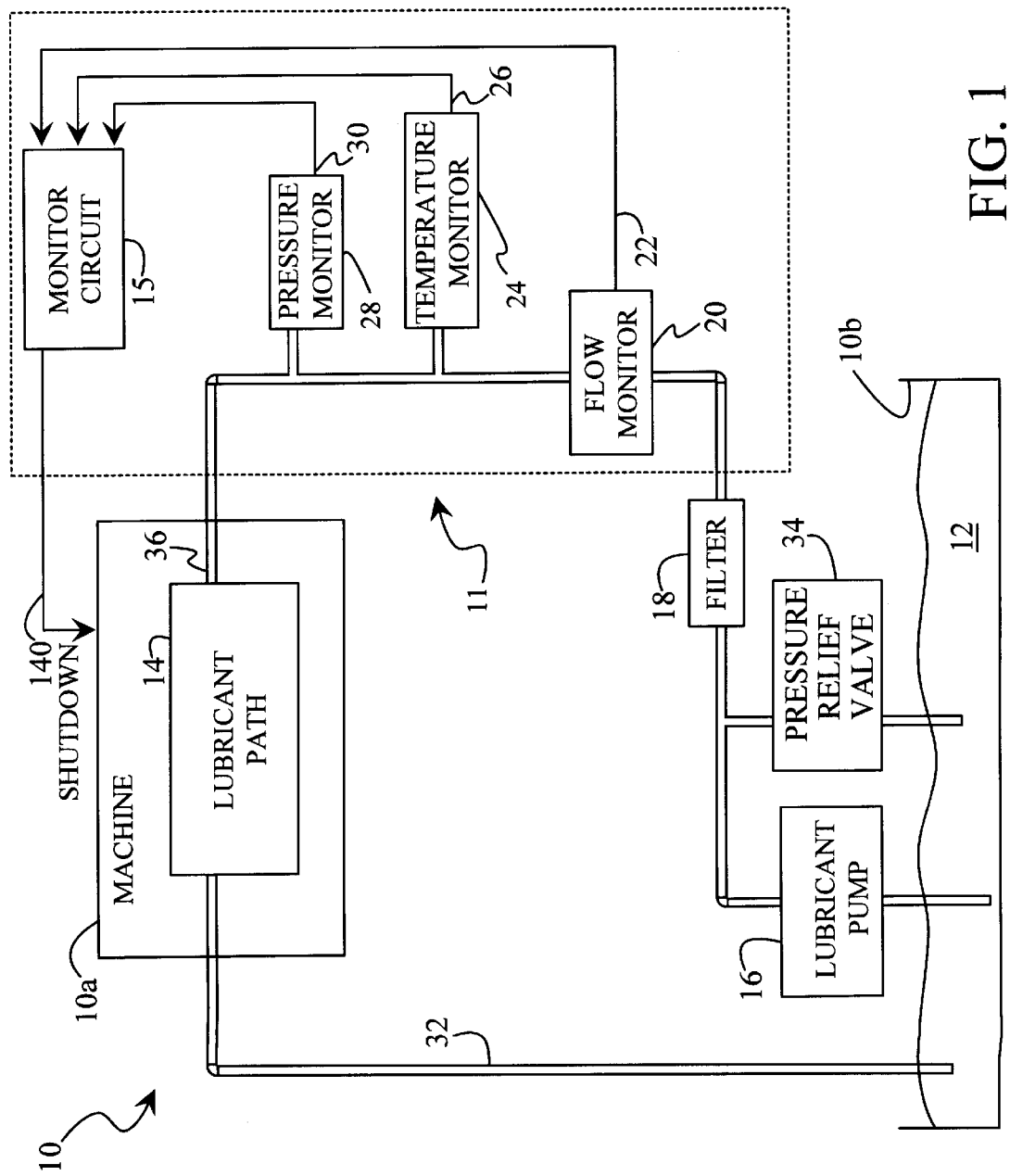
FIG. 1 illustrates schematically a preferred embodiment of the present invention as applied to an internal combustion engine.

FIG. 1 illustrates schematically an internal combustion engine 10 employing an engine lubrication system monitor 11 according to a preferred embodiment of the present invention. Engine 10 includes machinery 10a and a lubricant reservoir 10b. During operation of engine 10, lubricant 12 from reservoir 10b continuously passes along various conduits to and then through a lubricant flow path 14 of machinery 10a and thereafter returns to reservoir 10b. A lubricant pump 16 draws lubricant 12 from reservoir 10b and forces lubricant 12 through a lubricant filter 18 and through a flow monitor 20 as provided under the present invention. Flow monitor 20 provides a voltage level flow signal 22 corresponding linearly to the magnitude of lubricant 12 flow therethrough. Lubricant 12 then passes from flow monitor 20 past a lubricant temperature monitor 24, providing a linear voltage level temperature signal 26, and past a lubricant pressure monitor 28 providing a linear voltage level lubricant pressure signal 30. Lubricant 12 then enters machinery 10a at lubricant input 36 and passes through lubricant flow path 14, e.g., through various oilways and bearings, of machiniery 10a. Eventually, lubricant 12 exits flow path 14 and returns to reservoir 10b via a lubricant drain 32.

Engine 10 also includes a pressure regulator or relief valve 34 bypassing a portion of the output of pump 16 directly back into reservoir 10b. Valve 34 opens and permits lubricant 12 flow directly back into reservoir 10b only at a sufficiently high pressure as determined by the particular characteristics of valve 34. The remainder of lubricant 12 flow from pump 16 flows through filter 18 through flow monitor 20, past temperature monitor 24, past lubricant pressure monitor 28, and through lubricant flow path 14 as described above.

Lubricant flow path 14 represents collectively all paths lubricant 12 takes from input 36 through machinery 10a. Generally, path 14 presents a resistance to flow of lubricant 12 proportional to the magnitude of lubricant 12 flow through path 14 and proportional to lubricant 12 viscosity. Lubricant 12 pressure at input 36 is proportional to the physical size of the passages of flow path 14. At a given viscosity, lubricant 12 pressure at input 36 is proportional to the lubricant 12 flow rate at input 36, but only after flow path 14 has been first "charged", i.e., filled, with lubricant 12. As discussed more fully hereafter, lubricant 12 pressure at input 36 also varies in relation to the logarithm of the temperature of the lubricant at input 36.

The present invention recognizes various interrelationships among flow rate, temperature, and pressure and applies the corresponding siginals 22, 26, and 30 to a monitor circuit 15. Monitor circuit 15 produces various signals as a function of these monitor signals 22, 26, and 30 to produce a substantially constant ratio providing a basis for detecting normal engine 10 operation so long as this ratio remains substantially constant. Monitor circuit 15 produces a shut down signal 140 when this ratio deviates from its expected substantially constant value. Monitor circuit 15 there by protects engine 10 against damage due to lubrication system failure.

FIG. 2 illustrates as line 50 a linear variation in flow signal 22 (horizontal axis) with respect to actual lubricant flow (vertical axis) at input 36. In other words, flow meter 20 responds in linear fashion to the magnitude of lubricant 12 flow into machinery 10a at lubricant input 36. FIG. 3 illustrates as line 52 for a given temperature and viscosity of lubricant 12, a linear variation in pressure signal 30 (vertical axis) relative to flow signal 22 (horizontal axis). Pressure signal 30 remains at diminished or essentially zero magnitude during a time when flow path 14 is "charged", i.e., filled, with lubricant 12. Once flow path 14 fills with lubricant 12, pressure rises in linear fashion as illustrated in FIG. 3 as a function of flow rate. A charge flow signal (CFS), based on the vertical offset 54, accounts for "charging" of flow path 14 initially and during extreme low magnitude flow conditions.

The magnitude of the charge flow signal (CFS) varies according to the particular machine configuration, e.g., pump 16 capabilities and physical size of flow path 14. It will be understood, however, for a given machine configuration, desired oil viscosity, and reference oil temperature that a lubricant flow path 14 charging condition does occur, e.g., a diminished or essentially zero pressure interval during initial filling of the lubricant flow path 14. A corresponding charge flow signal (CFS) magnitude may be determined by calibration as described hereafter.

FIG. 4 illustrates by way of lines 60, 62, and 65 an inverse variation in lubricant pressure signal 30', i.e., signal 30 as offset by CFS, in relation to lubricant temperature. Lines 60, 62, and 65 represent the linear pressure and flow relationship but for three different operating temperatures $T_1$, $T_2$, and $T_3$, respectively. More particularly, line 60 represents flow versus pressure at a low boundary reference constant temperature $T_1$. Line 62 represents flow versus pressure at a relatively higher constant temperature $T_2$. Finally, line 65 represents the pressure and flow relationship at a greater constant temperature $T_3$. A vertical offset 64 indicates that pressure varies inversely with temperature, i.e., for greater temperatures pressure drops. Conceptually, line 62 may be "rotated" to line 62' according to a function of temperature. Similarly, line 65 may be "rotated" to line 65' according to a function of temperature. In this manner, pressure and flow relationships at distinct engine operating temperatures may be made coincident with line 60 at the reference temperature $T_1$.

In FIG. 5, the present invention recognizes that at a given constant temperature the ratio of pressure (as offset by CFS) to flow remains substantially at a constant lo magnitude value (CNT) as follows:

$$P_1/F_1 = P_2/F_2 = P_3/F_3 = CNT$$

Where $P_1$, $P_2$, and $P_3$ and corresponding $F_1$, $F_2$, and $F_3$ values, respectively, define line 60, i.e., flow and pressure relationship at the lower boundary reference temperature $T_1$. Thus, for engine operation at the low boundary reference $T_1$, e.g., 50 degrees centigrade, the pressure signal 30', i.e., signal 30 as offset by CFS, bears a constant ratio to the flow signal 22.

Unfortunately, engines don't operate at constant temperatures, and to maintain such constant ratio the pressure signal 30' is compensated to "rotate" higher temperature operating conditions, e.g., rotate lines 62 and 65 to line 60. This maintains a constant ratio between the compensated pressure signal 30" and the flow signal 22. Thus, FIG. 5 illustrates as line 60 a constant ratio relation between the compensated pressure signal 30" and flow signal 22. By "rotating" or compensating the pressure signal 30', i.e., by multiplying the pressure signal 30' by the log of temperature signal 26, line 60 represents not only the relationship between flow and pressure at the reference temperature $T_1$, but also for all temperatures greater than reference temperature $T_1$.

The physical size of the passages of lubricant flow path 14 can change, e.g., a leak or plug in flow path 14 can occur, and affect this constant ratio relationship. Similarly, the viscosity of lubricant 12 at a given temperature flowing through pathway 14 can change, e.g., degradation can occur, and affect this relationship. Thus, the constant ratio holds for normal engine operation, but deviates for abnormal engine operation.

Referring again to FIG. 4, offset lubricant pressure signal 30' varies in inverse relation to flow signal 22 as a function of the log of temperature signal 26. A temperature compensating circuit (FIG. 6) "rotates" an arbitrary line, e.g., line 62, to coincide with the reference temperature $T_1$ line 60. Thus, with reference to the equation $P_1/F_1 = P_2/F_2 = P_3/F_3 =$ CNT as stated above, signal 30' decreases with increasing temperature according to an inverse logarithmic rate. The output of the temperature compensating circuit of the present invention as discussed more fully hereafter keeps the values $P_1$, $P_2$, and $P_3$ constant with respect to changes in temperature of lubricant 12 flowing through flow path 14. Thus, for all flow rates of lubricant 12 passing through flow path 14, a ratio of the compensated lubricant pressure signal 30" to lubricant flow signal 22 remains substantially constant for any temperature above the reference temperature $T_1$. Any variation in CNT represents abnormal variation and, therefore, abnormal engine operation indicating potential engine damage, i.e., provides a basis for actuating a shut down system or for actuating an automatic alarm indication potential engine damage.

The following equation models an interrelationship between pressure, flow, and temperature providing a substantially constant result for normal engine operating conditions:

$$CNT = ((P+CFS)(LOG\ T) + (AS(F(T-T_{Ref}))))/F$$

Where T equals current engine temperature, F equals current lubricant flow, P equals current lubricant pressure, CFS equals an adjustable charge flow signal, AS equals an adjustable scalar value, and $T_{Ref}$ is a reference lower boundary engine operating temperature, e.g., 50 degrees centigrade. The lubricating system monitor 11 (FIG. 1) implements this model for pressure, flow, and temperature interrelationships in producing a substantially constant output value indicating, when at its expected value, normal operating engine conditions.

Figure 6:
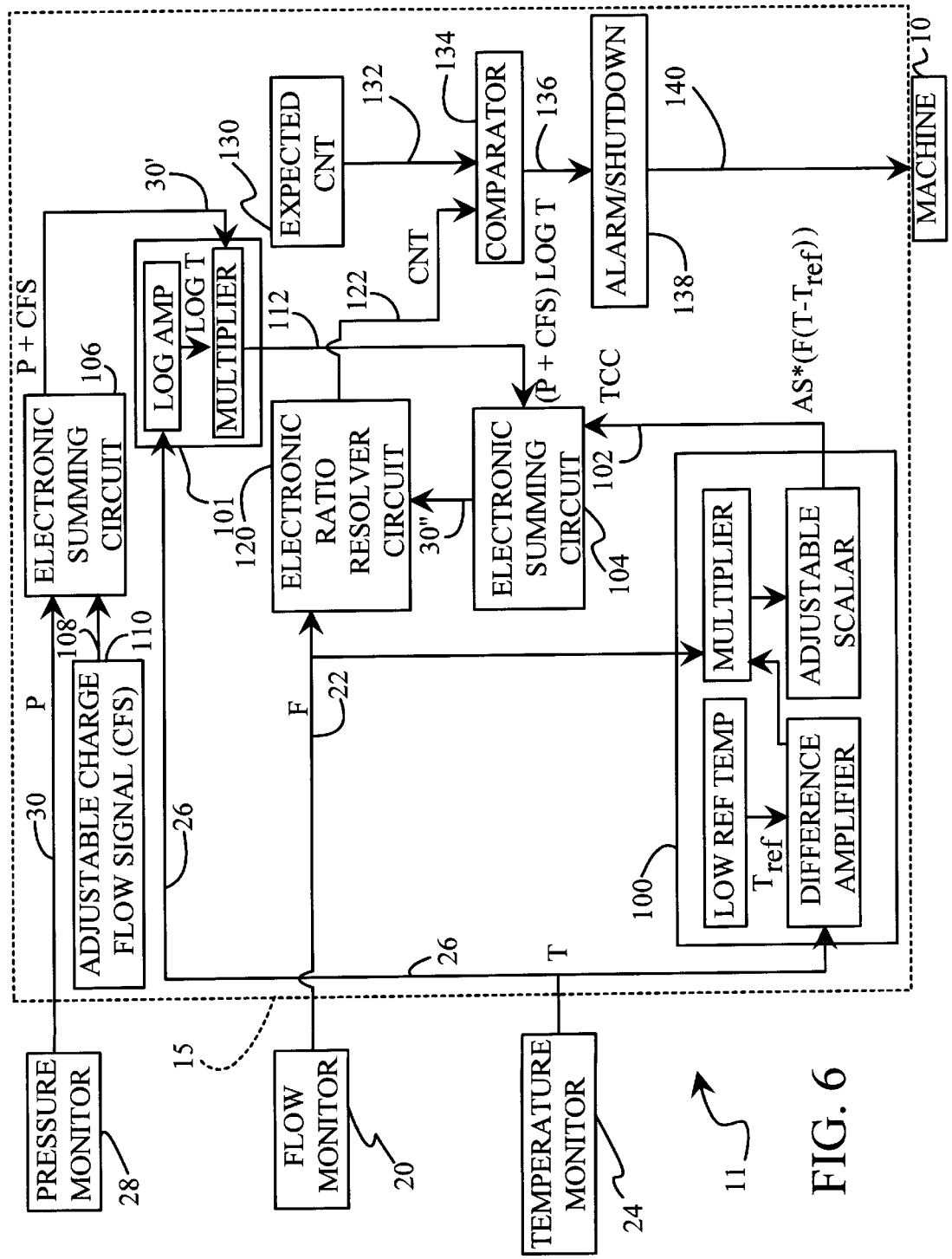
FIG. 6 illustrates by electronic block diagram collection of pressure flow, and temperature information and production of a substantially constant magnitude output signal representing at constant magnitude normal machine operation.

FIG. 6 illustrates in block diagram the lubricating system monitor 11 as the preferred embodiment of the present invention. In FIG. 6, temperature monitor 24, flow monitor 20, and pressure monitor 28 couple to machine 10 as described above to produce temperature signal 26, flow signal 22, and pressure signal 30, respectively. As may be appreciated, temperature monitors and pressure monitors are common on machinery such as internal combustion engines. A flow monitor, e.g., flow monitor 20, however, is not typically found in internal combustion engines and represents a modification to traditional engine design by requiring serial integration into the lubricant flow path to provide indication of a flow rate at the machine lubricant input 36.

Temperature signal 26 and flow signal 22 apply to a temperature compensating circuit 100 producing as a function thereof a temperature compensating signal (TCC) 102. Temperature compensating signal (TCC) 102 in turn applies to an electronic summing circuit 104. Pressure signal 30 applies to an electronic summing circuit 106 which also receives the adjustable charge flow signal (CFS) 108 from an adjustable charge flow signal (CFS) block 110. The magnitude of charge flow signal 108 as provided by block 110 remains substantially constant for a given machine 10, i.e., may be calculated or derived empirically for a given machine configuration. Electronic summing circuit 106 provides the sum of signals 30 and 108 as signal 30' (P+CFS) which in turn applies to a second temperature compensating, circuit 101. Temperature compensating circuit 101 calculates the log of the current temperature, i.e., signal 26, and multiplies the result by the offset pressure signal 30', i.e., by (P+CFS). The output of temperature compensating circuit 101 is applied as signal 112 to an electronic summing, circuit 104. Circuit 104 adds signals 102 and 112 to produce the compensated pressure signal 30". An electronic ratio resolver circuit 120 receives the flow signal 22 and the compensated pressure signal 30" and produces the substantially constant output CNT as signal 122, i.e., divides signal 30" by signal 22.

CNT signal 122 should remain, within an allowed narrow range, substantially constant. For a given engine configuration, i.e., expected range of temperature operation, physical size of lubrication pathway 14, lubrication fluid viscosity and expected range of flow rates during normal operation, a value for CNT can be derived by calculation or empirical measurement. Accordingly, an expected CNT block 130 provides an expected CNT signal 132 to a comparator 134. Comparator 134 also receives the actual CNT signal 122 as produced by electronic ratio resolver circuit 120. Comparator 134 allows some limited variation in signal 122 as compared to signal 132. However, upon variation outside such narrow range relative to the expected CNT signal 132, comparator 134 provides an alarm signal 136 to an alarm/shut down block 138. Alarm/shut down block 138, in response to signal 136, produces an alarm which an operator may react to and manually shut down operation of machine 10. Alternatively, alarm/shut down block 138 couples directly to machine 10 and provides an automated shut down signal 140.

As an example, the following values as taken from an actual operating machine are shown where CFS equals 0.70 volts, adjustable scalar value AS is set to 51.5%, and the reference temperature $T_1$ equals 50 degree centigrade as represented by the value 0.50 volts:

| FLOW SIGNAL(22) | PRESSURE SIGNAL(30) | TEMPERATURE SIGNAL(26) | CNT*10 |
|---|---|---|---|
| 2.91 | 2.57 | 50 degree = .50, TCC = 0.000 | 7.85 |
| 3.14 | 2.54 | 55 degree = .55, TCC = 0.808 | 7.90 |
| 3.37 | 2.51 | 60 degree = .60, TCC = 0.174 | 7.93 |
| 3.62 | 2.46 | 65 degree = .65, TCC = 0.280 | 7.87 |
| 3.84 | 2.40 | 70 degree = .70, TCC = 0.396 | 7.85 |
| 4.05 | 2.33 | 75 degree = .75, TCC = 0.521 | 7.83 |
| 4.25 | 2.26 | 80 degree = .80, TCC = 0.657 | 7.84 |
| 4.42 | 2.18 | 85 degree = .85, TCC = 0.797 | 7.86 |
| 5.13 | 2.42 | 90 degree = .90, TCC = 1.057 | 7.86 |
| 5.33 | 2.34 | 95 degree = .95, TCC = 1.235 | 7.89 |
| 5.42 | 2.30 | 98 degree = .98, TCC = 1.340 | 7.96 |

An example calculation at 70 degrees centigrade follows:

$T - T_{ref} = 70\ \text{degree} - 50\ \text{degree} = 0.70 - 0.50 = 0.20 = TC_1$ flow at 70 degree=3.84, $F * TC_1 = 3.84 * 0.20 = 0.768 = TC_2$ $TCC = 0.515 * TC_2 = 0.515 * 0.768 = 0.396$ $CNT = ((P+CFS)*(\text{LOG } 7.0) + TCC)/F$ $= (2.40 + 0.70)(0.8451) + 0.396)/3.84$ $= (2.620 + 0.396)/3.84 = 0.785 = CNT\ \ CNT*10 = 7.85$ The above table and example calculation clearly indicate that the constant value, i.e., signal 122, remains substantially constant even though pressure and flow vary significantly during engine operation across a range of operating temperatures. By providing a substantially constant signal despite variation in flow, pressure and temperature during normal engine operation abnormal engine operation may be interred when the constant output signal 122 deviates from this expected constant value.

Figure 7:
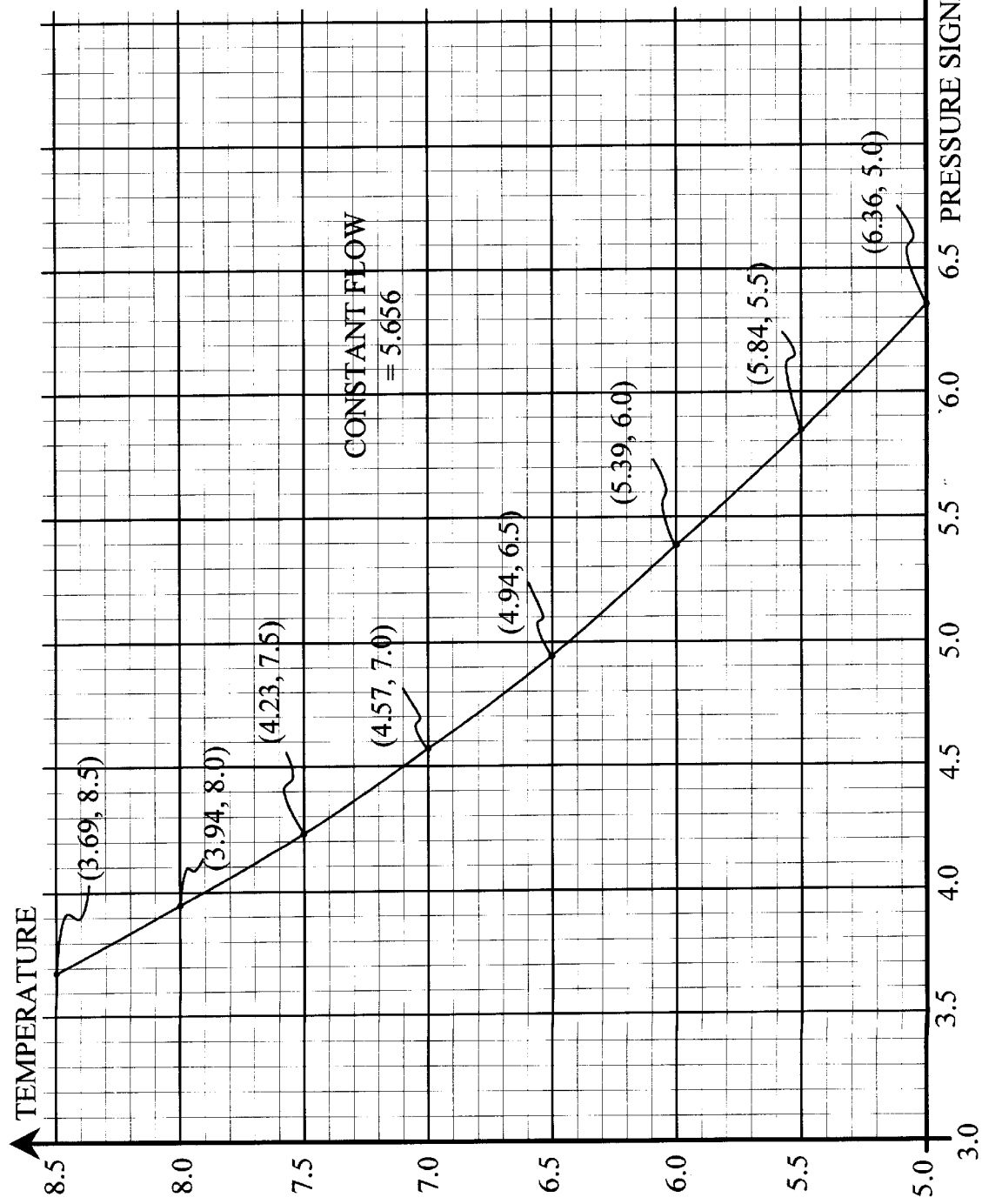
FIGS. 7 and 8 illustrate actual data taken from a machine lubrication system monitor according to the present invention.
Figure 8:
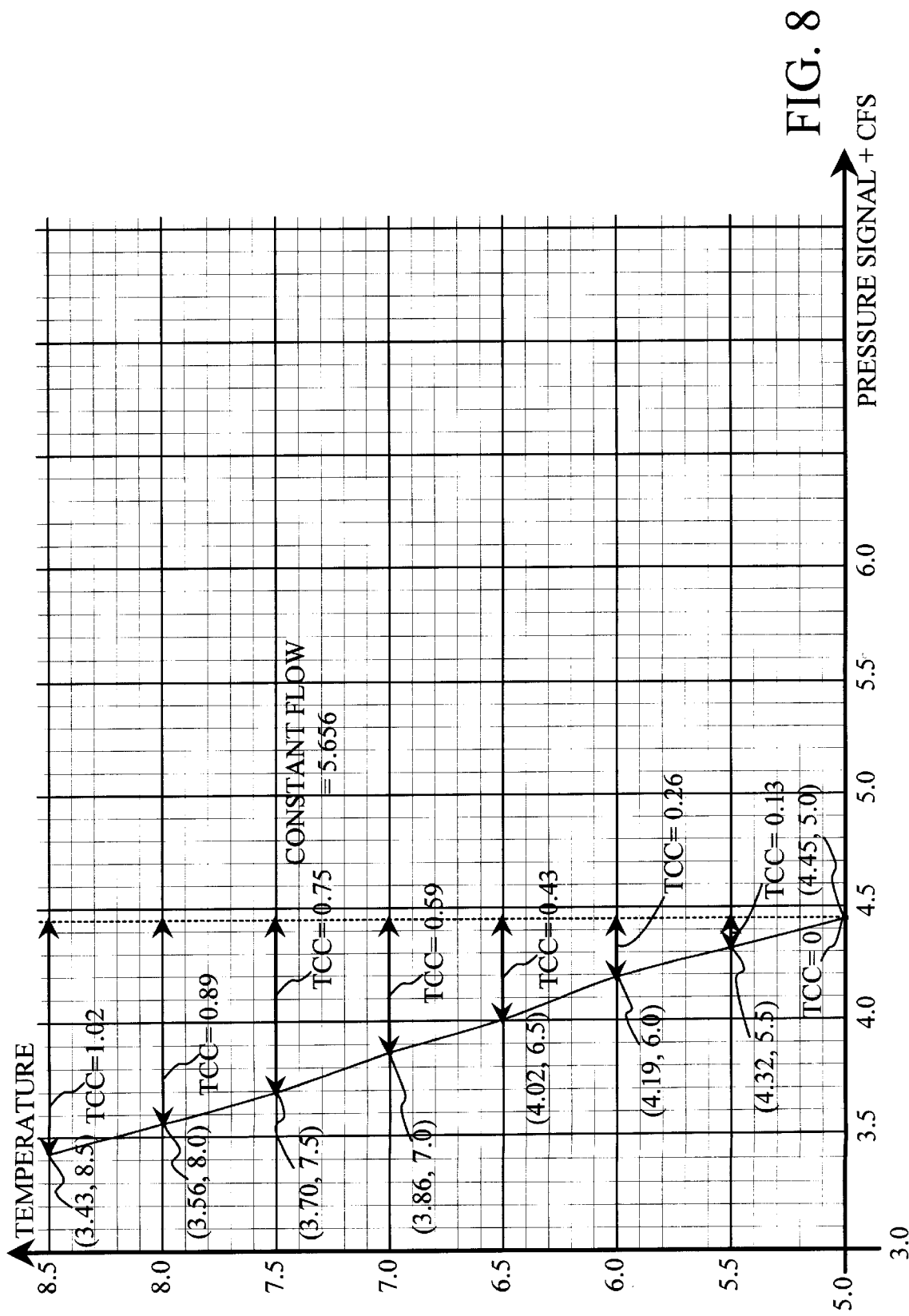

FIGS. 7 and 8 also illustrate by actual measurements the inverse relationship between pressure and temperature and compensation under the present invention. More particularly, as temperature increases, pressure decreases at a given constant flow rate. In FIG. 7, the horizontal axis represents the offset pressure signal 30' and the vertical axis represents temperature. The reference temperature $T_1$, i.e., 50 degrees centigrade, is coincident with the horizontal axis. Data points, plotted in FIG. 7 at 5 degree increments in temperature suggest an inverse logarithmic relationship where pressure decreases in inverse logarithmic relation to temperature. The data points plotted in FIG. 8 correspond to those plotted in FIG. 7, but are offset horizontally, i.e., pressure values diminished, according to the logarithm of temperature. Accordingly, each data point in FIG. 8 also corresponds to five degree increments of temperature but are compensated, i.e., offset horizontally in the pressure dimension, according to the logarithm of temperature. For each data point, a corresponding temperature compensation signal (TCC) 102 is shown whereby all data points may be related to a vertical reference line coincident with the data point taken at the reference temperature of 50 degrees centigrade, i.e., where the temperature compensating signal (TCC) 102 has a value zero. Thus, these actual values taken from a monitor circuit 15 according to a preferred embodiment of the present invention illustrate how pressure measurements may be compensated to a reference temperature condition for purposes of computing a constant output signal 122.

Circuit 11 may be initially calibrated as follows. The first step adjusts the scalar (AS) value for zero output with the machine operating in a normal condition with a lubricant 12 having the desired viscosity rating. At this point, one notes the value of CNT signal 122 at the reference temperature $T_{ref}$. The machine remains operating to allow lubricant 12 temperature to increase to a temperature near the higher limit of maximum lubricant temperature expected at input 36. At this point, one adjusts the adjustable scalar (AS) value so that CNT signal 122 returns to the same value as noted in the first step of the adjustable scalar (AS) calibration, i.e., as noted at reference temperature $T_{ref}$. The next step adjusts the charge flow signal (CFS). With the machine lubricant temperature at input 36 stabilized at a constant temperature, one varies the flow rate of lubricant through flow path 14 while also noting changes in the CNT signal 122. If the CNT signal 122 increases with an increase of flow through lubricant flow path 14, then one increases the value of CFS. Otherwise, if CNT signal 122 decreases with an increase of flow through flow path 14, then one decreases the value of CFS.

Thus, an improved lubricant system monitor has been shown and described. The monitor of the present invention recognizes certain relationships between signals taken from engine conditions including lubricant temperature, lubricant flow, and lubricant pressure. Recognizing such relationships provides a basis for computing a substantially constant signal as a ratio including information taken from engine sensors. By monitoring the output of a device computing this ratio, and detecting deviation therefrom, potentially damaging conditions may be detected immediately and invoke an alarm or automated engine shut down procedure. Thus, despite significant acceptable variations in lubricant temperature and lubricant pressure during normal operation of, for example an internal combustion engine, an operator need not evaluate such widely varying information. The operator relies on the monitor of the present invention to take such variations into account and produce a substantially single, constant magnitude indication of normal engine operation.

It will be appreciated that the present invention is not restricted to the particular embodiment that has been described and illustrated, and that variations may be made therein without departing from the scope of the invention as found in the appended claims and equivalents thereof.

What is claimed is:

1. A lubrication system monitor for an engine, said monitor comprising:

a first sensor adapted to monitor a first lubricant condition of said engine and provide a first signal representing said first lubricant condition;

a second sensor adapted to monitor a second lubricant condition of said engine and provide a second signal representing said second lubricant condition, at least one of said first and second sensors being a lubricant flow sensor; and a monitor circuit receiving said first and second signals and producing an output as a function of said first and second signals, said output being substantially constant for normal operation of said engine.

2. A system according to claim 1 wherein said first sensor is a pressure sensor and said first signal is a pressure signal taken from said pressure sensor modified according to at least a charge flow constant value and by a temperature-variant value.

3. A system according to claim 1 wherein said second sensor is a flow sensor and said second signal is a lubricant fluid flow value.

4. A system according to claim 1 wherein said system further comprises a third sensor operating as a temperature sensor and providing a temperature signal, said first sensor being a pressure sensor operating in conjunction with said temperature sensor to provide as said first signal a pressure signal modified as a function of said temperature signal.

5. A system according to claim 1 wherein said system further comprises a third sensor operating as a temperature sensor and providing a temperature signal, said first sensor being a pressure sensor providing a pressure signal and operating in conjunction with said temperature sensor to provide as said first signal a pressure signal modified as a function of said temperature signal.

6. A monitor for a machine, said machine including a lubrication system moving lubricating fluid through lubrication pathways of said machine, said monitor comprising:

a temperature sensor providing a temperature signal representing temperature of said lubricating fluid;

a pressure sensor providing a pressure signal representing a magnitude of pressure of said lubricating fluid at an input to said lubricating pathways;

a flow meter providing a flow signal representing a flow rate of said lubricating fluid entering said fluid pathway input; and a monitor circuit receiving said temperature signal, said pressure signal and said flow signal and producing during normal operation of said machine a substantially constant output signal, said output signal varying by given magnitude from said substantially constant magnitude during abnormal, potentially-damaging operation of said machine.

* * * * *